Aug. 28, 1962     P. C. D. MOY     3,051,295
MOBILE ELEVATORS

Filed March 21, 1960     3 Sheets-Sheet 1

INVENTOR
PETER CHARLES DUFFIELD MOY

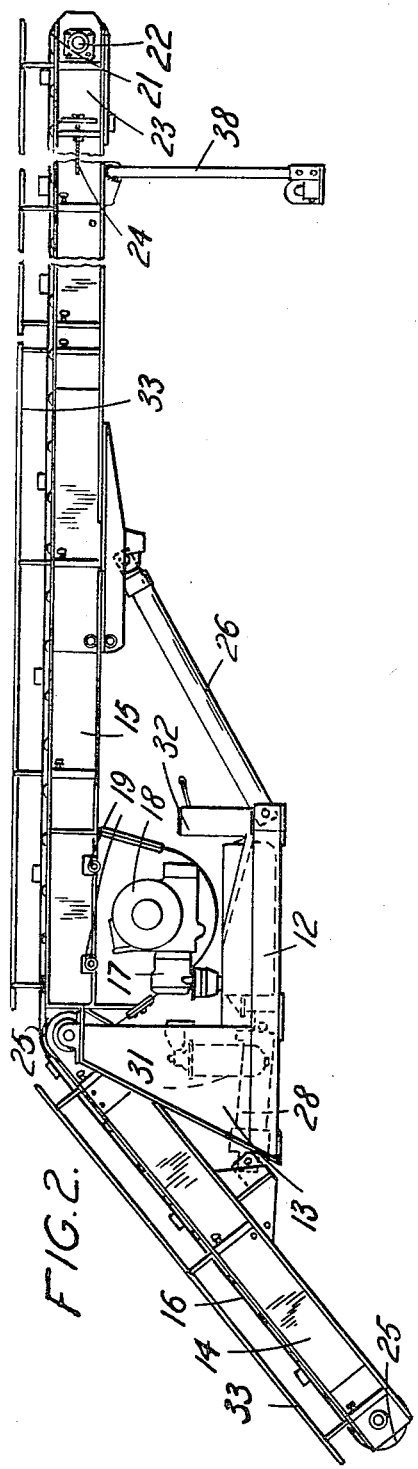

Aug. 28, 1962 P. C. D. MOY 3,051,295
MOBILE ELEVATORS
Filed March 21, 1960 3 Sheets-Sheet 3
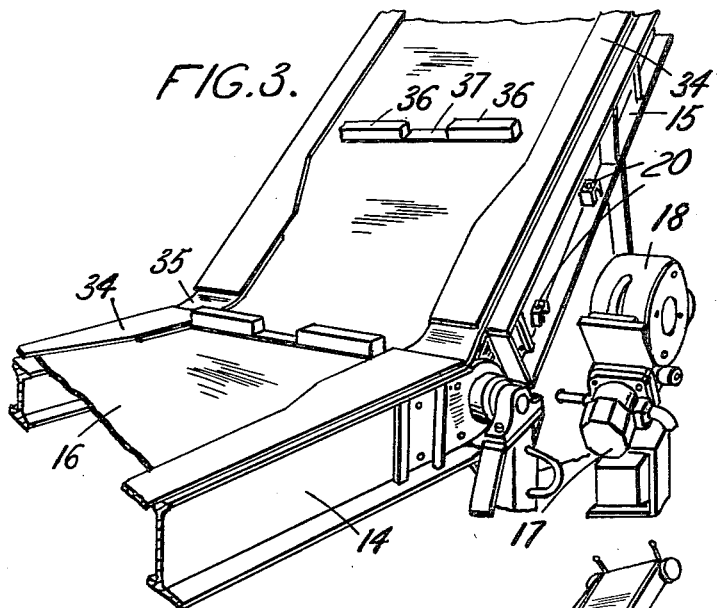
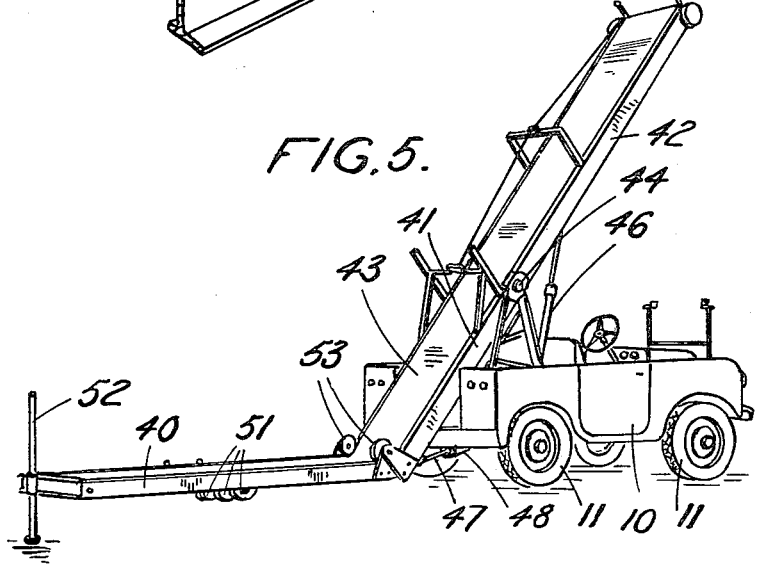
INVENTOR
PETER CHARLES DUFFIELD MOY
BY Mawhinney & Mawhinney
ATTYS United States Patent Office 3,051,295
Patented Aug. 28, 1962

3,051,295
MOBILE ELEVATORS
Peter Charles Duffield Moy, Flat 1, South Lee, Nowton Road, Bury St. Edmunds, Suffolk, England
Filed Mar. 21, 1960, Ser. No. 16,366
Claims priority, application Great Britain Mar. 23, 1959
9 Claims. (Cl. 198—115)

This invention relates to mobile conveying and elevating apparatus. According to the invention, a mobile conveying and elevating apparatus comprises a wheeled vehicle with an endless belt conveyor, the conveyor frame consisting of two or more sections which are articulated together so that the angle of elevation of at least one portion of the conveyor may be altered. By this arrangement, the height of at least one end of the conveyor can be adjusted. Preferably two sections are employed both being adjustable to enable both the feed and outlet end heights to be altered as required.

This mobile conveying and elevating apparatus finds particular application in the loading or unloading of vehicles and may be used for example for transferring goods from one vehicle to another, e.g. from a lorry to an aircraft or vice versa, or for loading goods from the ground on to a vehicle. By articulating together separate sections of a single conveyor, a continuous conveyor belt can be used with either the feed end or the outlet end or both ends being at adjustable heights above the ground.

Preferably the conveyor frame is formed of two booms extending outwardly from the articulation axis along the length of the conveyor, both of which booms are adjustable in angle of elevation by pivoting about their axis of articulation. The two booms may be pivoted co-axially on a frame on the vehicle. In some cases, however, the conveyor frame may conveniently be formed of three booms articulated together, for example to provide a feed portion near the ground and two elevating portions with adjustable angles of elevation.

Preferably, if two sections of conveyor are provided, the lower is arranged so that it can swing about its upper end between a position in which it extends upwardly with its lower end near the ground at least to a position in which it is substantially horizontal. The upper section preferably is arranged so that it can swing about its lower end from a substantially horizontal position to a position in which it is inclined upwardly from the lower section, for example at an angle of up to 40°.

The or each movable conveyor section may conveniently be raised and lowered by means of hydraulic rams.

Preferably the aforementioned vehicle is a self-propelled vehicle and, in this case, the engine of the vehicle may be used to drive the conveyor, conveniently through a hydraulic drive system. Reversing means may be provided to enable the belt to be driven in either direction. The engine may conveniently also supply power for the aforementioned hydraulic rams.

To facilitate the use of the conveying and elevating apparatus for a wide range of different jobs, preferably means are provided for adjusting the speed of travel of the conveyor belt.

The following is a description of two embodiments of the invention, reference being made to the accompanying drawings in which:

FIGURE 2 is a view in side elevation of part of the apparatus of FIGURE 1 showing the conveyor assembly and its drive mechanism in further detail;

FIGURE 3 is a perspective view of part of the conveyor of FIGURES 1 and 2;

FIGURE 5 is a side elevation of the apparatus of FIGURE 4 showing the system in an operative position.

Figure 1:
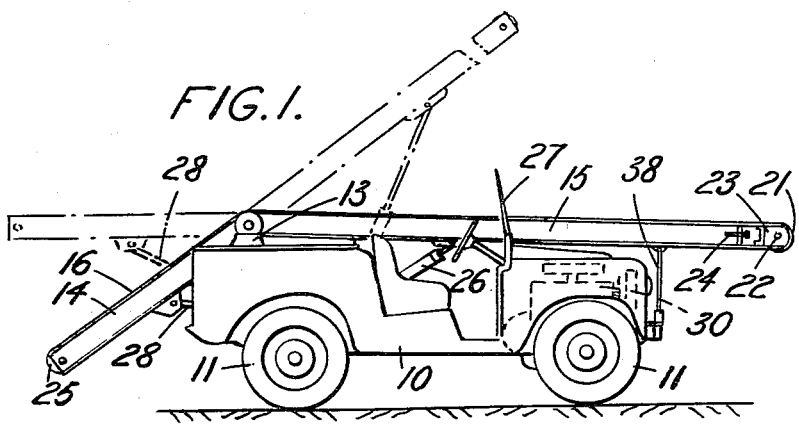
FIGURE 1 is a view in side elevation of a mobile elevator and conveyor.

Referring in FIGURES 1 to 3 there is shown a self-propelled vehicle 10 travelling on road wheels 11. To the chassis of the vehicle is secured a framework 12 having an upright support 13 on which are pivotally mounted for movement about a common pivot axis two booms 14, 15. Each of these booms is formed of a pair of steel section channel members. The boom 14 constituting the structural support of the lower portion of an articulated conveyor system, whilst the boom 15 forms the structural support of an upper portion of the conveyor system. A conveyor belt 16 extends continuously in a single loop along the length of the two booms and is driven by a reversible hydraulic motor 17 through a reduction gear 18. The motor 17 drives, through the reduction gear, a drive shaft carrying a driving drum (not shown) around which the lower, i.e. the return, section of the conveyor belt 16 passes, the belt being guided around the drive drum by idler wheels carried on shafts 19. The shafts 19 are adjustable in position by means of set screws 20 (FIGURE 3) to ensure that the belt is pinched between the idler wheels and the driving drum. At the front end of the upper boom 15, the belt 16 is taken around a drum 21 mounted in bearings 22 on side plates 23 which are adjustable in position by a tensioning device 24 to enable the belt tension to be adjusted. At the bottom end of the lower boom 14 and at the articulation point of the two booms, the belt is taken around idler drums 25.

The upper boom 15 can be raised and lowered by means of a hydraulic ram 26, the ram in this particular embodiment providing for movement of the boom from the horizontal position as shown in solid lines in FIGURE 1, in which the boom passes between two sections of the windscreen 27 of the vehicle 10, to an elevation of about 40° as shown in chain lines in FIGURE 1. The lower boom 14 can be raised or lowered by means of a hydraulic ram 28 which permits of movement of the lower boom from a position with the lower end near the ground, as shown in solid lines in FIGURE 1, to a horizontal position as shown in chain lines. The engine 30 of the vehicle 10 can be coupled to a pump (not shown) for pumping hydraulic fluid into a reservoir 31 which supplies the hydraulic rams 26, 28 and the hydraulic motor 17. The operation of the rams and motor is controlled by a manually operable valve unit 32. The speed of the conveyor belt 16 can be controlled using the throttle and gear box for the engine 30. The belt 16 can be driven in either direction by reversing the direction of drive of the hydraulic motor 17.

In the embodiment shown in FIGURE 2, retractable guard rails 33 are provided at the sides of the booms. These guard rails, however, are omitted from FIGURES 1 and 3 for clarity. Guide means are provided for holding down the edges of the conveyor belts and, as is most clearly seen in FIGURE 3, these guide means consist of rigid metal strips 34 extending along the lengths of the two booms above the peripheral edges of the belt 16. At the articulation axis it is necessary to hold down onto the idler drum 25 either the upper or the lower stretch of the belt 16 depending on the angular positions of the booms 14, 15. In the position shown in FIGURE 3 the upper stretch of belt has to be held down and, for this purpose, the metal strips 34 are joined by flexible spring steel strips 35 so forming a continuous guide along the whole length of the upper surface of the conveyor belt.

To permit of articulation of the booms, the strips 35 are slotted at their ends to slide on guide pegs under the guide strips 34. Idler rollers are provided as guides for the return length of belt on the under sides of the booms 14, 15. Battens 36 are provided in pairs spaced transversely across the belt 16 at intervals along the length of the belt 16. If the belt tension should for any reason be made too tight, there may be a tendency for the belt to arch transversely as it passes around the outside of the bend at the articulation axis and, to prevent this, the pairs of battens 36 are mounted on a spring steel strip 37 to impart stiffness to the centre of the belt between the battens.

If the apparatus is to be used for handling bulk material it may be desirable to use a belt having upturned edges.

A boom rest 38 is provided for locking the boom 15 in the travelling position, the lower end of the boom rest being secured to the front bumper of the vehicle.

Figure 4:
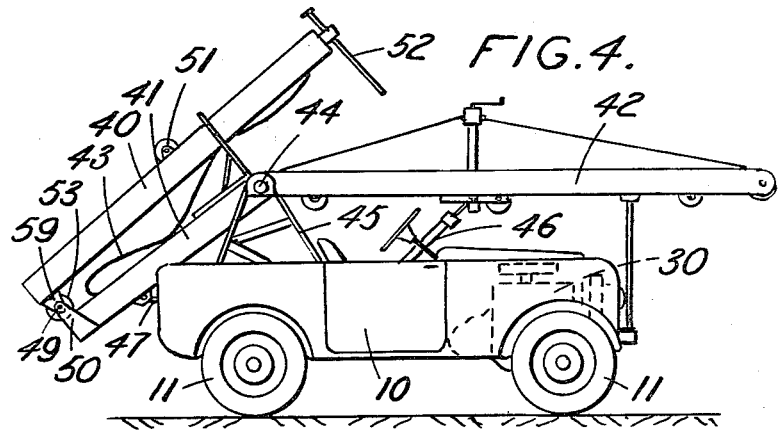
FIGURE 4 is a view in side elevation of a second form of mobile elevator and conveyor showing the system as positioned for travelling.

FIGURES 4 and 5 illustrate another embodiment of the invention in which, as before, a self propelled vehicle 10 supports the elevator and conveyor system. In this arrangement the elevator and conveyor system is arranged in three sections 40, 41, 42 with an endless belt 43 in a single loop extending along the length of the three sections. The sections 41, 42, that is to say the middle and front sections, are pivoted together about a common pivot axis 44 on a frame 45 mounted on the vehicle. The front section 42 can be raised and lowered by means of a hydraulic ram 46. The middle section 41 can be raised or lowered about the pivot axis 44 by means of a hydraulic ram 47 on the vehicle. The lowest or rear boom 40 is pivotally secured to the boom 41 by a pivot 49 extending through brackets 50 on the booms 40, 41. This rear boom 40 has belt supporting wheels 51 and is provided with a supporting jack 52 for resting on the ground when the conveyor is in operation. In FIGURES 4 and 5 there is shown, instead of the spring strips 35 of FIGURE 3, idler wheels 53 for holding the top surface of the belt 43 in position at the junction of the booms 40, 41. Similar idler wheels are provided to engage the peripheral edges of the lower surface of the return section of the belt at the junction of the booms 41, 42.

As in the arrangement of FIGURES 1 to 3, the conveyor belt of FIGURES 4 and 5 is driven by a hydraulic motor through a reduction gear, the hydraulic motor being powered from a pump driven by the engine of the vehicle.

In the arrangement of FIGURES 4 and 5, the booms 41, 42 are adjustable in elevation like the booms 14, 15 of FIGURES 1 to 3. The boom 40 is arranged so that it can be swung upwardly through an angle greater than 90° from the operative position shown in FIGURE 5 to the stowed position shown in FIGURE 4.

I claim:

1. A mobile conveying and elevating apparatus comprising a self-propelled vehicle, a conveyor support frame mounted on said vehicle, two booms pivoted co-axially on said support frame with one extending forwardly from the pivot axis and the other extending rearwardly, an endless conveyor belt extending along both said booms, a first elevating means mounted on said vehicle for elevating the forwardly extending boom between a substantially horizontal position and an upwardly inclined position, a second elevating means mounted on said vehicle for elevating said rearwardly extending boom between a position upwardly inclined toward said pivot axis and a substantially horizontal position, holding down means on said booms for holding down the upper run of said conveyor belt in the region of said pivot axis, and reversible drive means for driving said belt in either direction.

2. A mobile conveying and elevating apparatus comprising a self-propelled vehicle, a conveyor support frame mounted on said vehicle, two booms pivoted co-axially on said support frame with one extending forwardly from the pivot axis and the other rearwardly, a third boom pivoted on the rear end of said rearwardly extending boom to extend rearwardly therefrom, an endless conveyor belt extending along the length of all the booms, a first elevating means mounted on said vehicle for adjustably elevating said forwardly extending boom, a second elevating means mounted on said vehicle for adjustably elevating said rearwardly extending boom, an adjustable support member on said third boom for supporting the third boom at an adjustable height from the ground and reversible drive means for driving said belt in either direction.

3. A mobile conveying and elevating apparatus comprising a self-propelled vehicle, a conveyor support frame mounted on said vehicle, two booms pivoted co-axially on said support frame with one extending forwardly from the pivot axis and the other rearwardly, a third boom pivoted on the rear end of said rearwardly extending boom to extend rearwardly therefrom, an endless conveyor belt extending along the length of all the booms, a first elevating means mounted on said vehicle for elevating the forwardly extending boom between a substantially horizontal position and an upwardly inclined position, a second elevating means mounted on said vehicle for elevating said rearwardly extending boom between a position upwardly inclined towards said pivot axis at a substantially horizontal position, holding down means on said booms for holding down the upper run of said conveyor belt in the region of points of articulation of the booms, and reversible drive means for driving said belt in either direction.

4. A mobile conveying and elevating apparatus as claimed in claim 3 wherein said self-propelled vehicle has a driving motor and wherein said reversible drive means comprises a hydraulic motor on said vehicle with reversing means and a pump operated by said driving motor to provide pressure fluid for said hydraulic motor.

5. A mobile conveying and elevating apparatus as claimed in claim 3 wherein reversible drive means comprises a drive motor mounted on said vehicle, a belt driving drum mounted on one of said booms, transmission means coupling said drive motor to said drum to drive the latter, and idler pulleys on said one of said booms arranged to hold the underneath return stretch of said endless belt in contact with said drum to be driven thereby.

6. A mobile conveying and elevating apparatus as claimed in claim 3 wherein an adjustable support member is provided on said third boom for supporting the third boom at an adjustable height from the ground.

7. A mobile conveying and elevating apparatus comprising a self-propelled vehicle, a conveyor support frame mounted on said vehicle, two booms articulated together on pivot means carried on said support frame, elevating means for separately adjusting the angles of elevation of said two booms, an endless conveyor belt extending along the length of said two booms to have an upper stretch forming a conveyor and an underneath return stretch, a belt driving drum mounted on one of said booms, means holding the underneath return stretch of said conveyor belt in contact with said drum to be driven thereby, and a motor mounted on said vehicle and arranged to drive said drum.

8. A mobile conveying and elevating apparatus as claimed in claim 7 wherein said vehicle has a seat with adjacent controls for controlling the motion and operation of the vehicle and wherein said support frame is arranged so that the two booms extend in the fore-and-aft direction of the vehicle to one side of said seat.

9. A mobile conveying and elevating apparatus comprising a self-propelled wheeled vehicle having a driving motor, a conveyor frame mounted on said vehicle and consisting of two sections articulated together about a common pivot axis, hydraulic rams on the vehicle engaging the two sections for separately adjusting the angles of elevation thereof, an endless belt conveyor on said conveyor frame with a single endless belt extending along both said sections, a hydraulic motor on said vehicle with reversing means arranged for driving said belt conveyor in either direction, and a pump operated by said driving motor to provide pressure fluid for said hydraulic motor and said rams.

References Cited in the file of this patent

UNITED STATES PATENTS

| | | |
|---|---|---|
| 2,303,684 | Cook | Dec. 1, 1942 |
| 2,490,381 | Shields | Dec. 6, 1949 |
| 2,577,926 | Stiles | Dec. 11, 1951 |
| 2,632,556 | Alpers et al. | Mar. 24, 1953 |
| 2,778,477 | Lundahl | Jan. 22, 1957 |
| 2,782,943 | Jones et al. | Feb. 26, 1957 |